United States Patent
Powderly et al.

(10) Patent No.: US 6,760,785 B1
(45) Date of Patent: Jul. 6, 2004

(54) METHOD, APPARATUS, AND COMPUTER PROGRAM PRODUCT FOR ESTABLISHING COMMUNICATIONS BETWEEN AN ADAPTER CARD AND A HOST PROCESSOR RUNNING IN A BIOS SUPPORTED ENVIRONMENT

(75) Inventors: Terrence W. Powderly, East Fallowfield, PA (US); Joseph W. Zabaga, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/538,003

(22) Filed: Mar. 29, 2000

(51) Int. Cl.[7] .............................. G06F 3/00; G06F 9/24; G06F 15/177

(52) U.S. Cl. ...................... 710/2; 713/1; 713/2; 710/5; 710/6

(58) Field of Search .............................. 713/1, 2; 710/2, 710/5, 6

(56) References Cited

U.S. PATENT DOCUMENTS

| | | |
|---|---|---|
| 5,136,695 A | 8/1992 | Goldshlag et al. |
| 5,410,706 A | 4/1995 | Farrand et al. |
| 5,590,315 A | 12/1996 | Hess et al. |
| 5,604,509 A | 2/1997 | Moore et al. |
| 5,712,978 A | 1/1998 | Lerner et al. |
| 5,721,842 A | 2/1998 | Beasley et al. |
| 5,732,212 A | 3/1998 | Perholtz et al. |
| 5,732,268 A * | 3/1998 | Bizzarri ............................ 713/2 |
| 5,764,974 A | 6/1998 | Walster et al. |
| 5,794,239 A | 8/1998 | Walster et al. |
| 5,825,336 A | 10/1998 | Fujita et al. |
| 5,835,760 A * | 11/1998 | Harmer ............................ 713/2 |

* cited by examiner

Primary Examiner—Jeffrey Gaffin
Assistant Examiner—Joshua D Schneider
(74) Attorney, Agent, or Firm—Michael B. Atlass; Mark T. Starr

(57) ABSTRACT

Communications between an adapter card and a host computer system are established by embedding a server program within a BIOS extension stored in a memory on the adapter card. The BIOS extension is loaded into the host memory during normal execution of the host system BIOS for execution by the host processor. When executed by the host processor, the BIOS extension code copies the server program embedded within it to a new location in host memory, and then hooks the new location of the server program to a pre-selected interrupt of the host computer system to cause the host processor to initiate execution of the server program on the host computer system upon a subsequent occurrence of that interrupt. When executed on the host computer, the server program then establishes two-way communications with a client program executing on the adapter card.

21 Claims, 8 Drawing Sheets

(EXAMPLE SYSTEM FOR USE BY INVENTION)

under the control of the BIOS. The base addresses for the ISRs are generated by the BIOS during the POST routine and saved in the interrupt vector table. An IRQ ordinarily invokes the BIOS ISR for that particular IRQ.

METHOD, APPARATUS, AND COMPUTER PROGRAM PRODUCT FOR ESTABLISHING COMMUNICATIONS BETWEEN AN ADAPTER CARD AND A HOST PROCESSOR RUNNING IN A BIOS SUPPORTED ENVIRONMENT

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

FIELD OF THE INVENTION

The present invention is directed to computer systems, and more particularly, to methods, apparatus, and computer program products for communicating between a host computer and an adapter card connected to the input/output bus of the host computer.

BACKGROUND

The use of adapter cards to expand the capability of a host computer system is well known. Adapter cards are used to provide a wide variety of added or enhanced functionality to a host computer system, such as peripheral device interfaces, network communications interfaces, and graphics processing. Such adapter cards typically connect to the input/output bus of the host computer system. Several well-known industry standard input/output bus architectures include the Industry Standard Architecture (ISA), the Extended Industry Standard Architecture (EISA), and the Peripheral Component Interconnect (PCI) bus architecture. A computer system having any of these input/output bus architectures typically is equipped with a plurality of "slots" into which adapter cards can be inserted. Each slot is in essence a connector that connects to the address and data lines of the input/output bus. Each adapter card includes a mating connector, usually a printed circuit board edge connector, that can be inserted into one of the connectors, i.e., slots, of the host computer system.

Recently, there has been increased attention to designing more "intelligent" adapter cards to better off-load certain processing tasks, such as I/O processing, from the host computer. For example, the computer industry recently has begun to adopt and to implement solutions based on the Intelligent I/O ($I_2O$) Architecture Specification, which describes standard specifications for the development of intelligent I/O adapters and associated device driver software. These intelligent adapter cards typically include some form of instruction processor, such as an i960® or StrongARM® processor, both available from Intel Corporation, that can be programmed to perform various tasks that might otherwise not be available in a conventional adapter card. Local read-only and random-access memories are usually provided for storing and executing program code on the adapter card.

Many computer system architectures can be viewed as a series-of layers. The lowest layer is the actual hardware. The highest layer is the application program that interacts with the user. Between the hardware and application program layers is a layer of system software. System software typically includes the operating system and various devices drivers. The original IBM PC architecture, which has developed into the industry standard PC architecture used in more advanced personal computers, workstations, and servers today, includes an additional low-level software layer between the hardware and the system software. This low-level software layer is commonly referred to as the Basic Input/Output System (BIOS). The BIOS insulates the system and application software from the hardware and provides primitive I/O services and the ability to program the hardware's interrupt handling.

The system BIOS in computers and servers based on the industry standard PC architecture has the ability to extend or modify portions of the BIOS code with so-called BIOS extensions, sometimes also referred to as expansion ROMs or option ROMs. In the case of an adapter card, for example, a BIOS extension can be provided on the card to provide additional BIOS level control of certain low-level features of the card. For example, such BIOS extensions are commonly found on SCSI, video, and network interface adapter cards. When the host system BIOS executes its power-on self-test (POST), it searches for any BIOS extension code provided on any adapter cards connected to its input/output bus. If a BIOS extension is located, the host loads the BIOS extension code into its host memory for execution (a process sometimes referred to as "shadowing"). After executing the BIOS extension code, the system BIOS completes its normal POST execution, which typically concludes with the booting of the operating system.

As additional background information, computers and servers based on the industry standard PC architecture are mainly controlled through the use of interrupts. Interrupts can be generated by the processor, other hardware devices, or the software. When an interrupt occurs, control of instruction execution transfers to a software routine, commonly referred to as an interrupt handling routine, that provides an appropriate programmed response to the interrupt. Each interrupt is assigned its own unique interrupt number, and each interrupt number is associated with its respective interrupt handling routine by an interrupt vector that specifies the address in the host memory or system BIOS of the interrupt handling routine.

A table of interrupt vectors is created by the system BIOS during its POST routine. The system BIOS creates the interrupt vector table in host memory from a rom-based table and initializes the vector addresses of the low-level interrupt handling routines of the BIOS. Afterwards, the operating system boots and initializes any of the vector addresses of interrupts that are reserved for it. Likewise, an application program that issues its own interrupts must initialize the associated vector addresses in the table. A process known as "hooking an interrupt" can be used by software to replace an already established interrupt vector address with a new address of a different interrupt handling routine to alter the system response to that particular interrupt—the original interrupt vector address for that interrupt number is replaced in the interrupt vector table with the new address.

Microprocessor interrupts are invoked by the processor as a result of some unusual program result, such as an attempt to divide by zero. In the standard PC architecture, interrupt numbers 00h–04h (typically designated INT 00h–04h) are reserved for the processor. Hardware interrupts are invoked by peripheral devices that set their respective interrupt request lines (IRQ). Each time a key is pressed, for example, the keyboard hardware generates an interrupt. Hardware interrupts are vectored to Interrupt Service Routines (ISRs)

(a form of interrupt handling routine) that generally reside in the system BIOS. INTs 08h–0Fh and 70h–77h are reserved by the system BIOS for hardware interrupts. Lastly, software interrupts are invoked via the 80×86 INT instruction. Most software interrupts are vectored to Device Service Routines (DSRs) (another form of interrupt handling routine) located in the BIOS, in the operating system, or in an application program.

Communication between a host computer and an adapter card is usually performed by the use of device drivers in combination with the host operating system. Each adapter card is typically provided with one or more device drivers that are loaded and installed on the host computer system. A device driver insulates the operating system and application programs from the low-level hardware details of the adapter card. Nevertheless, it may be desirable in some cases to enable communication between a host computer system and an adapter card in the absence of the host operating system or before the host operating system boots. It would also be desirable for the adapter card to be able to utilize such communications to invoke various functions of the system BIOS in the absence of the host operating system. The present invention provides a method and apparatus for establishing such communication.

SUMMARY OF THE INVENTION

The present invention is directed to a method, apparatus, and computer program product for establishing communications between an adapter card and a host computer system running in a BIOS supported environment. According to the present invention, communications between the adapter card and the host computer system are established by embedding a server program within a BIOS extension stored in a memory on the adapter card. The BIOS extension is loaded into the host memory during normal execution of the host system BIOS for execution by the host processor. When executed by the host processor, the BIOS extension code copies the server program embedded within it to a new location in host memory, and then hooks the new location of the server program to a pre-selected interrupt of the host computer system to cause the host processor to initiate execution of the server program on the host computer system upon a subsequent occurrence of that interrupt. Preferably, the pre-selected interrupt number to which the server program code is hooked is one that is normally invoked by the system BIOS at some point in its execution. When the server program executes, it then establishes communication with a client program executing on a processor of the adapter card.

In a preferred embodiment, the present invention prevents the host operating system from booting, allowing communications between the adapter card and the host computer system to occur in the absence of a host operating system, but with access to the full range of functions provided by the host system BIOS. For example, the client program on the adapter card can communicate a request to the server program to invoke any of the normal functions of the host system BIOS. Any results can be communicated back to the client program.

In an alternative embodiment, the host operating system is permitted to boot, in which case the server program operates in the presence of the host operating system.

Additional features and advantages of the present invention will become evident hereinafter.

DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

The present invention is directed to methods and apparatus for establishing communications between an adapter card and a host computer system having a binary input/output system (BIOS) that supports the loading of BIOS extensions into the host memory for execution by the host processor. Host computer systems of this type include personal computers, workstations, and servers based on the industry standard PC architecture, which typically employ one or more Intel® microprocessors, such as the Pentium® or Itanium™ families of microprocessors, and which typically support one or more of the ISA, EISA, and PCI input/output (I/O) bus architectures. While the present invention is described herein in the context of a host computer system based on the industry standard PC architecture, it is by no means limited thereto. Rather, the present invention may be employed in any computer system having low-level system software that supports the loading of extension code from an adapter card for execution by the host processor.

Portions of the present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, read-only memory, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
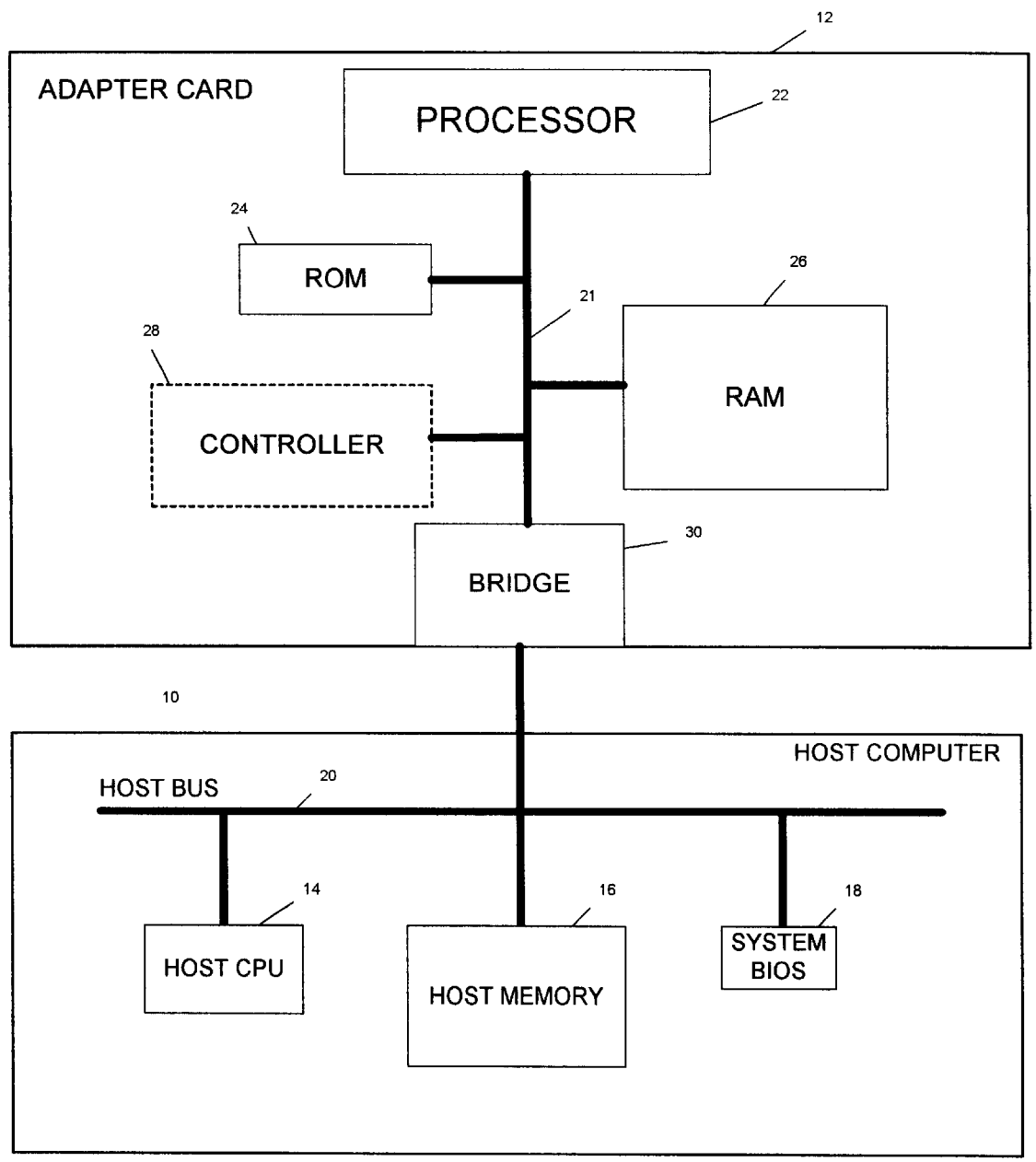
FIG. 1 is a block diagram illustrating an exemplary host computer system and adapter card in which the present invention can be embodied.

Referring now to the drawings, wherein like numerals represent like elements throughout, FIG. 1 show an exemplary host computer system 10 and an adapter card 12 in which the present invention may be embodied. The host computer system 10 in this example is a personal computer, workstation, or server based on the industry standard PC architecture. The exemplary host computer system 10 comprises a host processor 14, which may comprise, for example, one or more Intel® Pentium® or Intel® Itanium™ processors, a host memory, which typically is a random access memory (RAM), and at least one host input/output (I/O) bus 20, such as an ISA, EISA, or PCI bus. For purposes of illustrating a preferred embodiment of the present invention, it will be assumed that the Host I/O bus 20 is a PCI bus based on Revision 2.1 of the PCI specification.

The exemplary host computer system 10 also has a system BIOS 18 in the form of code stored in a read-only memory. BIOS code for host computer systems based on the industry standard PC architecture is available from a variety of manufacturers, including Phoenix Technologies Ltd. and American Megatrends, Inc. Numerous publications are available providing information concerning the industry standard features of such BIOS code, including, for example, System BIOS for IBM PCs, Compatibles, and EISA Computers: the complete guide to ROM-based system software, Second Edition, © 1991 Phoenix Technologies Ltd., which is incorporated herein by reference in its entirety.

The adapter card 12 connects to the host I/O bus 20, which as mentioned above is compliant with revision 2.1 of the PCI specification. Again, however, it is understood that the present invention is by no means limited to use with PCI-based I/O buses, but rather, can be employed in any I/O bus environment, including, for example, other industry-standard bus specifications, such as ISA and EISA, as well as other, proprietary I/O bus implementations.

The adapter card 12 comprises a processor 22, a read-only memory (ROM) 24, and a local random-access memory (RAM) 26. The adapter card may also comprise a bridge circuit 30, such as a PCI-to-PCI bridge, creating a secondary PCI bus 21 local to the adapter card 12 and to which the other components of the card interface. In a preferred embodiment, the processor 22 comprises an i960® microprocessor available from Intel Corporation, operating under the control of the VxWorks® real-time operating system (RTOS) available from Wind River Systems. In this embodiment, the operating system code is stored in the ROM 24. Upon reset of the i960® processor, the processor loads and boots the VxWorks operating system. In other embodiments, the particular microprocessor and operating system may be different. Preferably, the ROM 24 is a flash memory device, thereby permitting updates to the code stored therein.

Typically, an adapter card of the type illustrated in FIG. 1 will further comprise some form of controller 28 for implementing a function that the card is designed to perform. For example, an adapter card for network communications (e.g., Ethernet) will include a network interface controller, an adapter card for interfacing Small Computer Systems Interface (SCSI) devices to the host computer system, such as hard disk drives, scanners, and the like, will include a SCSI controller, and an adapter card for graphics processing will include a graphics controller. The present invention can be employed in any adapter card, regardless of the function that it is designed to perform.

Figure 2:
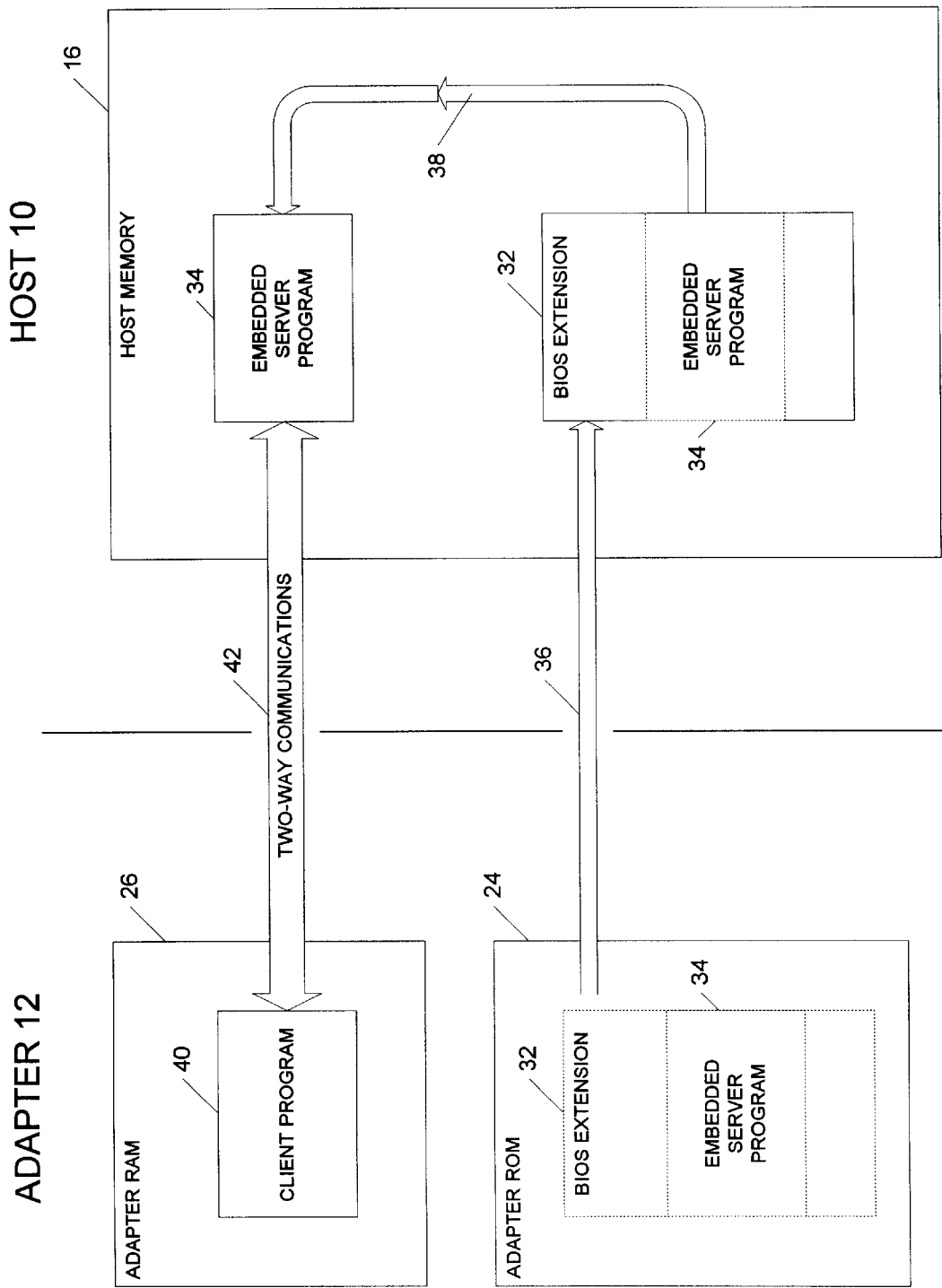
FIG. 2 graphically illustrates a method of the present invention.

FIG. 2 graphically illustrates a method of the present invention, as implemented in the exemplary host computer system 10 and adapter card 12 of FIG. 1. According to the method, a BIOS extension 32 is stored in the ROM 24 of the adapter card 12. The BIOS extension 32 of the present invention comprises first program code that performs the overall functions of the BIOS extension, and second program code that defines a separate server program embedded within the first program code. In the present embodiment, in which the adapter card 12 and host I/O bus 20 implement the PCI bus specification, PCI configuration registers on the adapter card 12 identify the location of the BIOS extension 32 in the ROM 24. The host system BIOS uses this information to locate the BIOS extension 32 on the adapter card. The BIOS extension 32 of the present invention can completely replace a traditional BIOS extension that might normally be present on the adapter card to support the operation of a particular controller 28. Alternatively, the BIOS extension 32 of the present invention can be selectively swapped back and forth with a traditional BIOS extension. This would allow an operator of the host computer system 10 to selectively invoke the functions of the present invention whenever needed, but to allow the adapter card to perform its normal functions at other times.

As is typical of computer systems based on the industry standard PC architecture, after a host computer reset or power-on, the host system BIOS 18 begins executing its power-on self-test (POST) code, during which it identifies and assigns addresses to all devices connected to the host I/O bus 20, including the adapter card 12 in which the present invention is embodied. As part of this process, the host system BIOS determines from the PCI configuration registers on the adapter card 12 whether any BIOS extensions are to be loaded from the adapter card. In accordance with the present invention, the system BIOS 18 will locate the BIOS extension 32 in the adapter ROM 24 in the standard manner, and as illustrated at step 36 of FIG. 2, will copy the BIOS extension of the present invention into the host memory 16, i.e., the BIOS extension 32 will be shadowed.

At a subsequent point in the execution of the system BIOS 18, all BIOS extensions that have been copied to the host memory, including the BIOS extension 32 of the present invention, will be executed by the host processor 14. As described hereinafter in greater detail, when the BIOS extension 32 of the present invention begins to execute, the first program code causes the host processor 14 to extract the embedded server program code 34 from the BIOS extension 32 and to copy it to a new location in host memory, as indicated at step 38. The first program code of the BIOS extension 32 then hooks the new location of the server program 34 to a pre-selected one of the software interrupts of the host system. Subsequently, upon the occurrence or invocation of that interrupt, the normal interrupt handling process of the host computer system 10 will cause the server program to execute on the host processor 14. The server program 34 then establishes a two-way communication with a client program 40 on the adapter card, as indicated at step 42.

Figure 3:
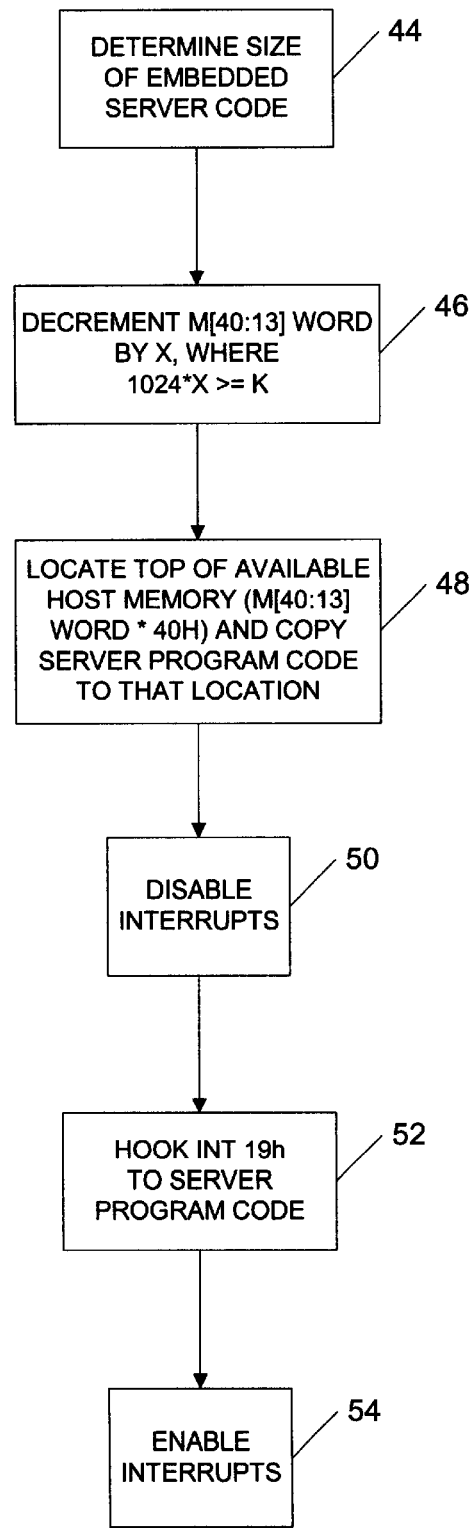
FIG. 3 is a flow diagram illustrating the operation of a BIOS extension of the present invention in accordance with a preferred embodiment thereof.
Figure 4:
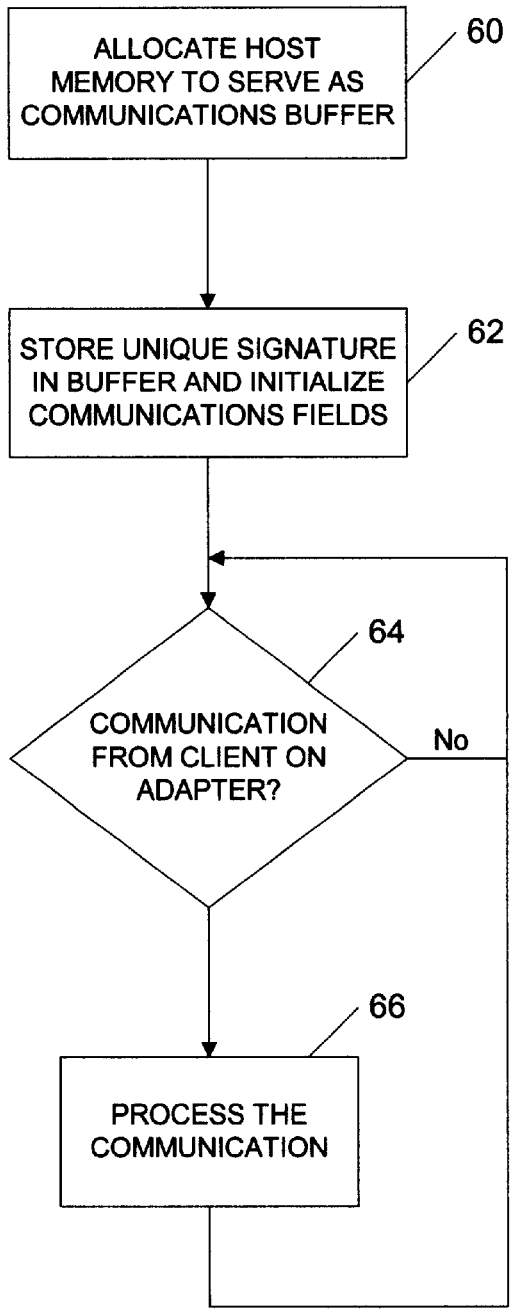
FIG. 4 is a flow diagram illustrating the operation of a server program of the present invention in accordance with the preferred embodiment.

FIGS. 3 and 4 provide further details of the operation of the first and second program code, respectively, of the BIOS extension 32 of the present invention, in accordance with a preferred embodiment thereof. Again, it is assumed that the host computer system 10 is based on the industry standard PC architecture and that its system BIOS operates in accordance with that standard. Also, it assumed that the adapter card 12 and host I/O bus 20 implement and conform to the PCI bus specification, revision 2.1. As mentioned above, however, the present invention is by no means limited thereto.

FIG. 3 illustrates the functions performed by the first program code of the BIOS extension 32 when executed by the host processor 14 during the POST routine of the system BIOS 18. In step 44, the first program code determines from a constant, K, embedded within the code at compile time, the size of the embedded server program code 34 (i.e., the second program code). In step 46, the first program code decrements the value stored at word 40:13h of the host memory (designated M[40:13h] WORD) to allocate a portion of host memory in which to copy the embedded server program code 34. In the industry standard PC architecture of the host computer system 14, the word at M[40:13h] identifies the amount of available base memory in kilobytes as it is determined by the BIOS POST routine. When multiplied by 40h, this value essentially provides a pointer to the top of available host memory (sometimes also referred to as the Top of DOS Memory). To allocate memory for the server program code 34 in step 46, the first program code decrements M[40:13h] WORD by X, where (X*1024≧K). Next, in step 48, the first program code locates the newly allocated portion of host memory 48 (M[40:13h]*40h) and then copies the embedded server program code 34 to that location, effectively extracting it from the BIOS extension 32.

Next, at step 50, the first program code disables all host system interrupts. At step 52, the first program code "hooks" the server program code to software interrupt 19h (INT 19h). This is done by copying the starting location of the server program code to the interrupt vector entry for INT 19h. In the industry standard PC architecture, INT 19h is the software interrupt that is invoked to execute the operating system bootstrap loader in order to boot the operating system. The system BIOS normally invokes INT 19h at the conclusion of its POST routine. By hooking this interrupt with the server program code, this embodiment of the present invention prevents the operating system from booting, causing the host processor instead to begin executing the server program code. After hooking interrupt 19h, the first program code re-enables all host system interrupts at step 54. At this point, control passes back to the system BIOS which completes its normal execution.

FIG. 4 is a flow diagram illustrating further details of the operation of the server program code 34 in accordance with the preferred embodiment. As explained above, in this embodiment, execution of the server code begins when the system BIOS calls INT 19h at the conclusion of its POST routine. Referring to the Figure, at step 60, the server program first allocates a portion of host memory to serve as a communications buffer between the server program and the client program (described hereinafter) executing on the adapter card 12. Specifically, the server program obtains the contents of host RAM location 40:13h to again identify the top of available host memory. The server program then decrements that value based on the desired size of the communication buffer, thereby reserving that portion of the host memory as the communications buffer. At step 62, the server program stores a unique signature (i.e., a predetermined pattern of data) in the communications buffer at a predefined offset from the start of the buffer. As described more fully hereinafter, the client program uses the value at location 40:13h of host RAM 16 to identify where the communication buffer should be, but then relies upon the presence of the unique signature to ensure that the server program has indeed created the buffer.

Next, at step 64, the server program enters a loop to await communications from the client program. Any communication received from the client program will be processed at step 66, and the server program will then loop back to await additional communications.

The client program 40 (described hereinafter) and server program 34 use a portion of the communication buffer established by the server program 34 in step 60, as a shared memory region containing fields for controlling the exchange of information between them. Specifically, the shared memory region contains three fields designated O (for originator—in this case the client program 40), T (for target—in this case the server program 34), and TR (for target ready). The O and T fields are used for handshaking, and the TR field is used to indicate that the target is ready to receive a communication from the originator. In the present embodiment, the client program 40 has read and write access to the O field, but it can only read the T and TR fields. The server program 34 has read and write access to the T and TR fields, but it can only read the O field.

When communications are not occurring or needed, O=T=0, and TR=1. When the client program is required to send information to the server program, it writes the information to the communication buffer and sets O=1. The client program then waits for T=1.

When the server program 34 detects that O has been set to 1, it sets TR=0 and extracts the information from the buffer. The information extracted from the buffer may be a request for the server program to perform some operation and, if necessary, to send a result back to the client program. If a result is required, the server program 34 writes the result in the buffer. The server program 34 then sets T=1, and waits for the client program to reset O to 0.

When the client program 40 detects that T has been set to 1 by the server program 34, it reads the result from the buffer and sets O to 0 to acknowledge receipt of the result. When the server program 34 detects that O has been set to 0, it sets T=0 and TR=1. At this point the client and server programs are ready for another communication. This originator/target protocol ensures race-condition free communications. While the client program 40 on the adapter card 12 is the originator in this embodiment, and the server program 34 on the host computer system 10 is the target, in other embodiments, this could be reversed.

Figure 5:
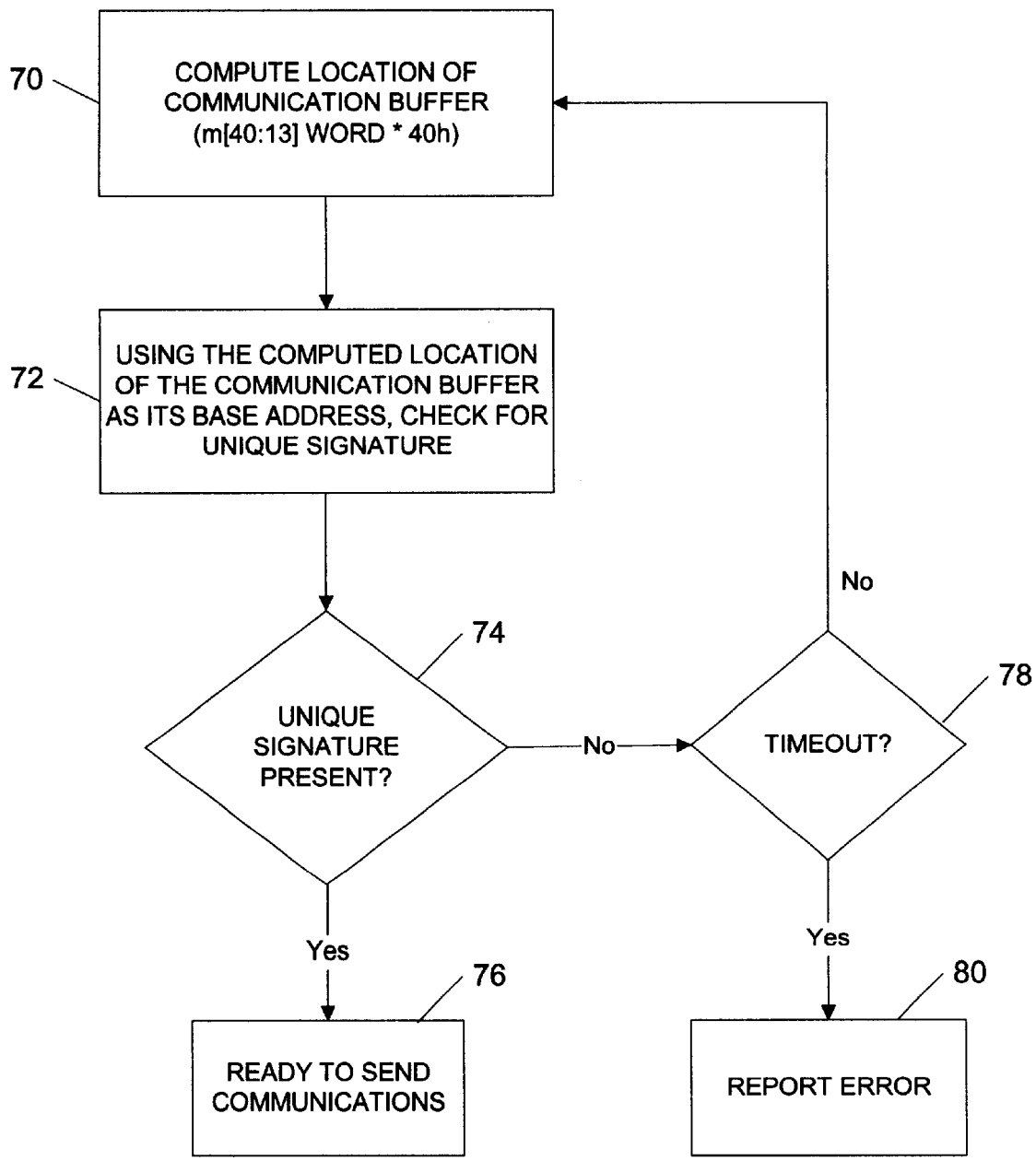
FIG. 5 is a flow diagram illustrating the operation of a client program of the present invention in accordance with the preferred embodiment.

FIG. 5 is a flow diagram providing further details of the operation of the client program 40 in accordance with a preferred embodiment thereof. At step 70, the client program 40 retrieves the value stored in the host memory at location M[40:13h] WORD (the top of available memory indicator). Because no other host system BIOS code should have changed that value after the server program 34 decremented it to define the communications buffer, the client program 40 can rely upon the value in identifying the location of the start of the communication buffer. Accordingly, the client program multiples M[40:13h] WORD by 40h to compute the segment address for the start of the allocated communications buffer.

Next, at step 72, using the computed location of the start of the communications buffer as its base address, the client program looks for the unique signature written by the server program 34 in step 62 of FIG. 4, at the predefined offset from the base address. If at step 74, the signature is not found, it is assumed either (i) that a failure has occurred in the loading or execution of the BIOS extension 32 or in the execution of the server program 34, or (ii) that the BIOS extension 32 or server program 34 has not yet completed the steps necessary to establish the communications buffer. In the preferred embodiment, as illustrated at steps 78 and 80, the client program will continuously repeat steps 70 and 72 for a predetermined timeout period. If no signature is detected during the timeout period, the client program will then report an error and terminate (step 80). In other embodiments, the client program could simply report an error and terminate upon the initial failure to locate the signature.

If at step 74 the unique signature is found, then control passes to step 76 where the client program is ready to send communications to the server program in accordance with the originator/target protocol described above. Because the server program 34 is executing on the host processor 14, and because the present embodiment allows the system BIOS to complete its normal execution, all of the callable functions of the system BIOS (invoked using the INT instruction), such as the keyboard services (INT 16h), video services (INT 10h), disk services (INT 13h), serial communications services (INT 14h), system services (TNT 15h), parallel printer services (INT 17h), and others can be invoked by the server program. Thus, the present invention provides a means to invoke the functionality of the host system BIOS via the communications between the client program on the adapter card and the server program on the host computer. For example, to request the server program 34 to make a particular call to a system BIOS function, the client program 40 can pass a pre-defined op-code for that function to the server program 34 via the communication buffer, along with any parameters required to carry out the function. The server program 34 can be coded to recognize the pre-defined op-code and to make the appropriate call to the desired system BIOS function. Any results that need to be reported back to the client program 40 can be sent back via the communications buffer in the manner described above. A user or another program executing on the adapter card 12 can thus use the client program 40 to communicate with the server program 34 on the host computer 10 and to carry out work on the host computer system, as desired.

Figure 6:
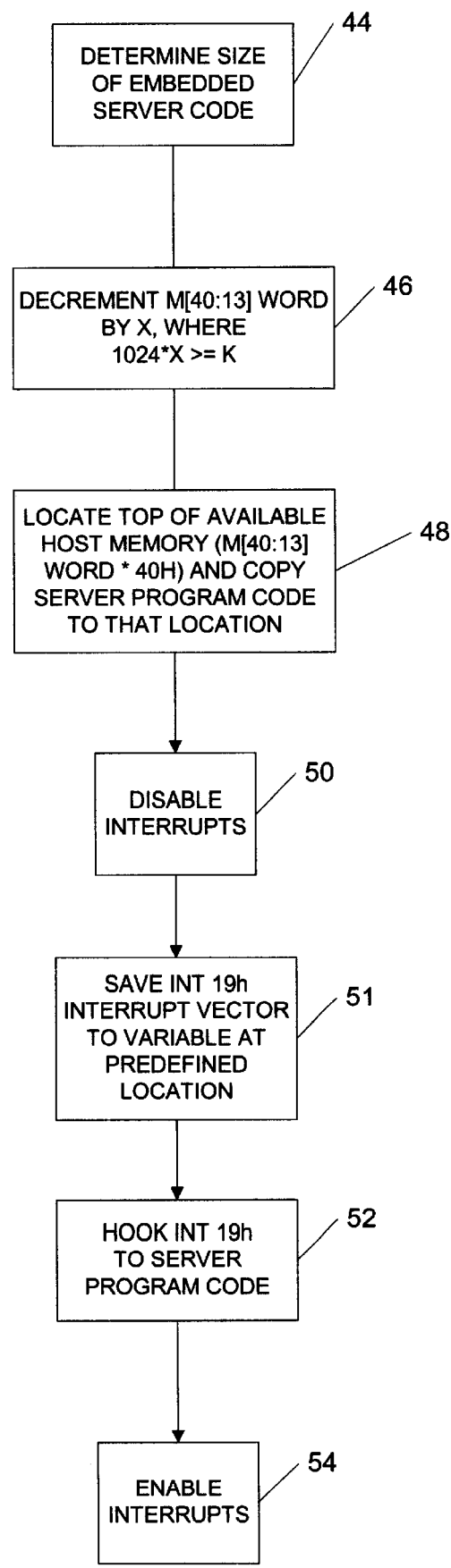
FIG. 6 is a flow diagram illustrating the operation of a BIOS extension of the present invention in accordance with an alternative embodiment thereof.
Figure 7A:
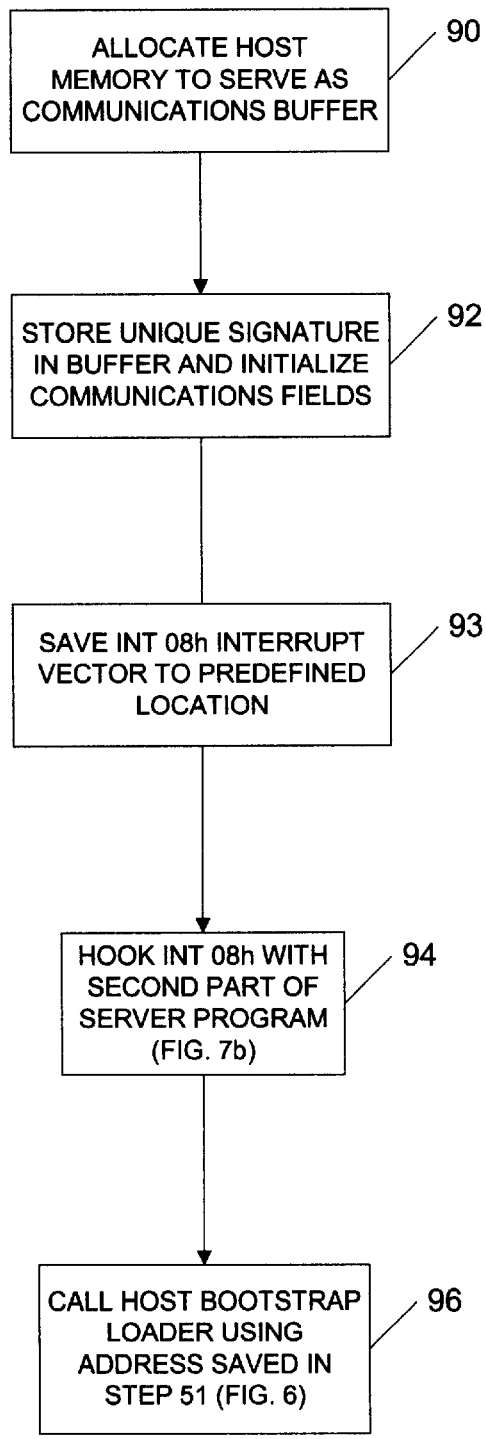
FIGS. 7*a* and 7*b* are flow diagrams illustrating the operation of a server program of the present invention in accordance with the alternative embodiment.
Figure 7B:
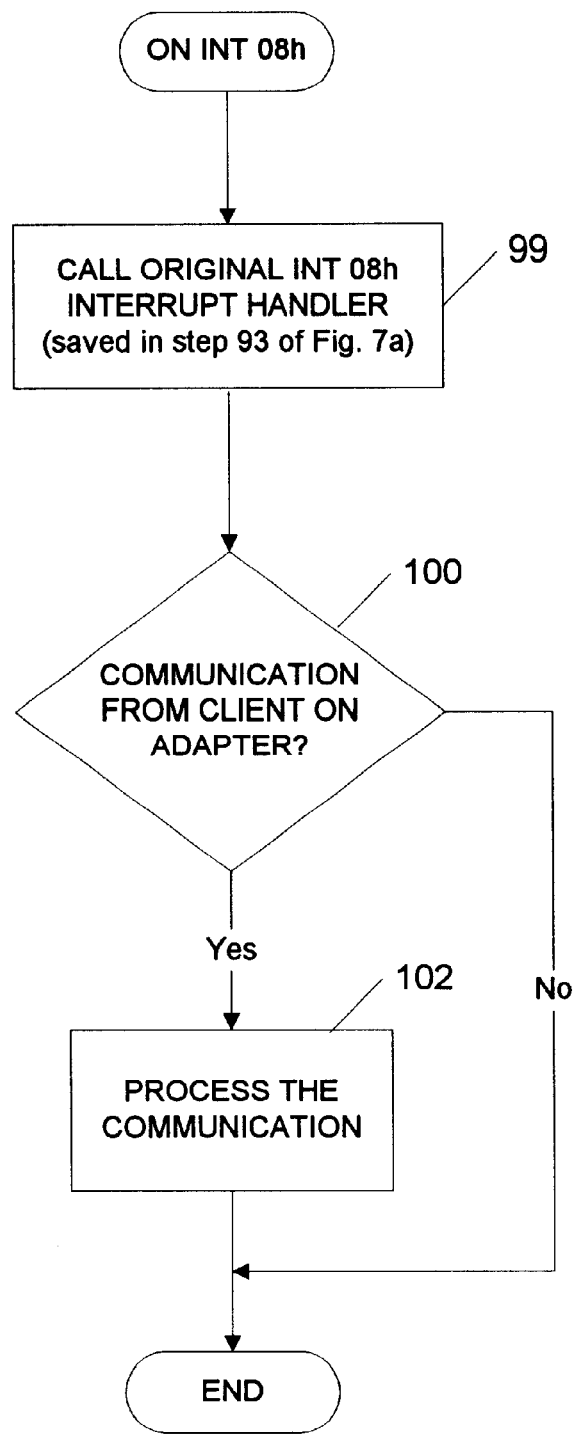

FIGS. 6, 7a and 7b illustrate an alternative embodiment to the present invention in which the host operating system is allowed to boot. As into two parts, the first of which is hooked to INT 19h, and the second of which is hooked to the host system clock interrupt, INT 08h. The first part of the server program allocates the communications buffer, writes the unique signature to the buffer at the pre-defined offset, and sets up the O, T, and TR fields for subsequent communications. The second part of the server program, which is called repeatedly each time the system clock interrupt is generated, checks for communications from the client program and processes the communications in accordance with the originator/target protocol described above. Further details are provided below.

FIG. 6 is a flow diagram illustrating the operation of the first program code of the BIOS extension 32 in accordance with this alternative embodiment. In this embodiment, the first program code of the BIOS extension performs essentially the same steps as in the embodiment illustrated in FIG. 3, except that a new step 51 is added. Specifically, prior to hooking INT 19h with the location of the server program code in step 52, the BIOS extension 32 first saves the original interrupt vector value for INT 19h (i.e., the address of the host's bootstrap loader) to a variable at a predefined location within the allocated memory space of the BIOS extension 32. Otherwise, the BIOS extension 32 operates in the same manner as described above in connection with FIG. 3.

FIGS. 7a and 7b illustrate the operation of the first and second parts of the server program 34, respectively, in accordance with this alternative embodiment. Referring first to FIG. 7a, execution of the first part of the server code begins when the system BIOS calls INT 19h at the conclusion of its POST routine. As in the previous embodiment, at step 90, the first part of the server program first allocates a portion of host memory to serve as a communications buffer between the server program and the client program. As before, the server program obtains the contents of system RAM location 40:13h to identify the top of available host memory. The server program then decrements that value based on the desired size of the communication buffer, thereby reserving that portion of the host memory as the communications buffer. Next, at step 92, the server program stores a unique signature (i.e., a predetermined pattern of data) in the communications buffer. As in the previous embodiment, the client program 40 uses the value at location 40:13h of system RAM to identify where the communication buffer should be, and then relies upon the presence of the unique signature to ensure that the server program has indeed created the buffer.

At this point, the operation of the first part of the server program departs from the operation of the server program in the previous embodiment. Specifically, at step 93, this part of the server program saves the interrupt vector for interrupt number 08h (the host system clock interrupt) to a variable in the portion of host memory 16 allocated to the server program. Next, at step 94, the server program hooks the address of the start of the code of the second part of the server program (illustrated in FIG. 7b) to INT 08h by replacing the original interrupt vector for INT 08h (saved in step 93) with the address of the second part of the server program. At step 96, the first part of the server program then transfers program execution to the host bootstrap loader using the original interrupt vector address for INT 19h that was saved by the BIOS extension 32 in step 51 of FIG. 6. This causes the host operating system to boot, thus differing from the previous embodiment in which the host operating system does not boot.

Because the second part of the server program of this alternative embodiment is hooked to the host system clock interrupt (INT 08h), its code will be executed each time the clock interrupt occurs. The flow diagram of FIG. 7b illustrates the operation of the second part of the server program. As shown, at step 99, the second part of the server program first calls the original INT 08h interrupt handler using its original interrupt vector saved in step 93 of FIG. 7a. This allows the host computer system 10 to service the clock interrupt as it normally would. Next, at step 100, the server program checks the communications buffer, specifically the O field of the originator/target protocol described above, to determine whether the client program has attempted to communicate with it. If there is no communication from the client program (i.e., O=0), then the code terminates as shown. This process will repeat on each clock interrupt.

If a communication is detected in step 100, then at step 102, the server program will process the communication as appropriate, and will return any required result in accordance with the originator/target protocol described above. Once the communication has been processed, execution terminates, as shown. Again, however, this process will repeat on every occurrence of the host clock interrupt. Hooking this second part of the server program to a periodically recurring interrupt effectively provides the same functionality as the program loop defined by steps 64 and 66 of FIG. 4 in the previous embodiment. While in the presently described embodiment, this part of the server program is hooked to INT 08h, in other embodiments, any other periodically recurring interrupt can be hooked instead.

Intel, i960, Pentium, and Itanium are either trademarks or registered trademarks of Intel Corporation. StrongARM is a trademark of Advanced RISC Machines, Ltd. VxWorks is a registered trademark of Wind River Systems.

As the foregoing illustrates, the present invention is directed to a method, apparatus, and computer program product for establishing communications between an adapter card and a host computer system running in a BIOS supported environment. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. An adapter card for use in a host computer system having a processor and a memory, the host computer system having a binary input/output system (BIOS) that supports the loading of BIOS extensions into the host memory for execution by the host processor, the adapter card comprising:
   a processor, and
   at least one computer-readable medium having stored therein:
   (a) a client program that is executed by the processor of the adapter card; and
   (b) a BIOS extension comprising first program code and second program cod embedded within the computer readable medium, said second program code defining a separate server program, the BIOS extension being loaded into the host memory during execution of the host computer system BIOS,
   the first program code of the BIOS extension, when executed by the host processor, and prior to an operating system exercising control over the host processor's system, performing the following steps;
   (i) copying the second program code defining the server program to a new location outside a BIOS expansion memory area in the host memory; and
   (ii) hooking the new location of the server program to an interrupt of the host computer system to cause the host processor to initiate execution of the server program on the host computer system upon a subsequent occurrence of that interrupt
   the server program when executed on the host processor, establishing communications with the client program on the adapter card wherein the copying step performed by the first program code of the BIOS extension comprises:
   (i) determining the size of the second program code by obtaining a constant, K, said K having been embedded at a predetermined location within the first program code at compile time;
   (ii) decrementing, by an amount greater than or equal to K, a value stored in host memory at address word location 40:13h, said location having a value that provides an indicator of the top of available host memory, thereby allocating that portion of host memory from top of host memory to an address equal to said amount greater than or equal to K below top of host memory; and
   (iii) copying the second program code to the allocated portion of host memory.

2. The adapter card recited in claim 1, wherein the first program code of the BIOS extension hooks the new location of the server program to the operating system bootstrap loader interrupt of the host computer system, thereby causing said server program to be executed upon the occurrence of that interrupt instead of the operating system bootstrap loader of the host computer system.

3. The adapter card recited in claim 1, wherein the server program, when executed on the host processor, performs the following steps to establish communications with the client program on the adapter card:
   (a) allocates a portion of the host memory to serve as a communications buffer, and
   (b) stores a unique signature in the allocated communications buffer at a predetermined location therein.

4. The adapter card recited in claim 3, wherein said allocation step comprises decrementing a value stored in host memory that provides an indicator of the top of available host memory.

5. The adapter card recited in claim 3, wherein the client program, when executed on said processor of the adapter card, performs the following steps:
   (a) locates the communications buffer using the indicator of the top of available host memory; and
   (b) determines whether the unique signature has been stored at said predetermined location therein to verify that the communications buffer has been created by the server program.

6. The adapter card recited in claim 1, wherein the server program comprises a first part and a second part, the first part of the server program performing the following steps when executed on the host processor:
   (a) allocates a portion of the host memory to serve as a communications buffer;
   (b) stores a unique signature in the allocated communications buffer at a predetermined location therein;
   (c) saves the original interrupt vector for the host computer system clock interrupt to a predefined location in the host memory; and
   (d) hooks the start of the code of the second part of the server program to the host computer system clock interrupt,
   the second part of the server program performing the following steps upon each occurrence of the host computer system clock interrupt;
   (e) call the original interrupt vector for the host computer system clock interrupt saved in step (c); and
   (f) check the communications buffer for any communication from the client program.

7. An adapter card as set forth in claim 1 wherein said server program is copied to a top of host memory location.

8. A method for communicating between a processor on an adapter card and a processor of host computer system to which the adapter card is connected, the host computer system having a binary input/output system (BIOS) that supports the loading of BIOS extensions from an adapter card into a memory of the host computer system for execution by the host processor, said method comprising:
   a) executing a client program on the processor of the adapter card;
   b) causing a BIOS extension stored in a computer-readable medium on the adapter card to be loaded into the memory of the host computer system during execution of the host computer system BIOS, the BIOS extension comprising first program code and second program code, the second program code defining a separate server program, the first code of the BIOS extension, when executed by the host processor, and prior to an operating system exercising control over the host processor's system, performing the following steps:

(i) copying the second program code defining the server program to a new location in the host memory outside of a host memory BIOS expansion area; and (ii) hooking the new location of the server program to an interrupt of the host computer system to cause the host processor to initiate execution of the server program on the host computer system upon a subsequent occurrence of that interrupt, the server program, when executed by the host processor, establishing communication with the client program executing on the adapter card; and (c) utilizing the client program to communicate information to, and to receive information from, the server program on the host computer system wherein the copying step performed by the first program code of the BIOS extension comprises:

(i) determining the size of the second program code by obtaining a consat, K, said K having been embedded at a predetermined location within the first program code at compile time;

(ii) decrementing, by an amount greater than or equal to K, a value stored in host memory at address word location 40.13h, said location containing a value that provides an indicator of the top of available host memory, thereby allocating that portion of host memory from top of host memory to an address equal to said amount greater than or equal to K below top of host memory; and (iii) copying the second program code to the allocated portion of host memory.

9. The method recited in claim 8, wherein the first program code of the BIOS extension hooks the new location of the server program to the operating system bootstrap loader interrupt of the host computer system, thereby causing said server program to be executed upon the occurrence of that interrupt instead of the operating system bootstrap loader of the host computer system.

10. The method recited in claim 8, wherein the server program, when executed on the host processor, performs the following steps to establish communications with the client program on the adapter card:

(a) allocates a portion of the host memory to serve as a communications buffer; and (b) stores a unique signature in the allocated communications buffer at a predetermined location therein.

11. The method recited in claim 10, wherein said allocation step comprises decrementing a value stored in host memory that provides an indicator of the top of available host memory.

12. The method recited in claim 10, wherein the client program, when executed on the adapter card, performs the following steps:

(a) locates the communications buffer using the indicator of the top of available host memory; and (b) determines whether the unique signature has been stored at said predetermined location therein to verify that the communications buffer has been created by the server program.

13. The method recited in claim 8 wherein the server program comprises a first part and a second part, the first part of the server program performing the following steps when executed on the host processor:

(a) allocates a portion of the host memory to serve as a communications buffer;

(b) stores a unique signature in the allocated communications buffer at a predetermined location therein;

(c) saves the original interrupt vector for the host computer system clock interrupt to a predefined location in the host memory; and (d) hooks the start of the code of the second part of the server program to the host computer system clock interrupt, the second part of the server program performing the following steps upon each occurrence of the host computer system clock interrupt;

(e) call the original interrupt vector for the host computer system clock interrupt saved in step (c); and (f) check the communications buffer for any communication from the client program.

14. A method as set forth in claim 8 wherein said outside of expansion BIOS memory area is at a top of host memory location.

15. A computer-readable medium having stored therein a binary input/output system (BIOS) extension for use on an adapter card that connects to a host computer system having a processor and a memory, the host computer system having a BIOS that supports the loading of said BIOS extension into the host memory for execution by the host processor, the BIOS extension comprising:

first program code and second program code, the second program code being embedded within said computer-readable medium and defining a separate server program, the BIOS extension being loaded into the host memory during execution of the host computer system BIOS and prior to an operating system exercising control over the host processor's system, the first program code of he BIOS extension when executed by the host processor, performing the following steps:

(i) copying the second program code defining the server program to a new location in the host memory said new location, being outside of a BIOS expansion area; and (ii) hooking the new location of the server program to an interrupt of the host computer system to cause the host processor to initiate execution of the server program on the host computer system upon a subsequent occurrence of that interrupt, the server program when executed by the host processor, establishing communication with a client program executing on a processor of adapter card.

16. The computer-readable medium recited in claim 15, wherein the first program code of the BIOS extension hooks the new location of the server program to the operating system bootstrap loader interrupt of the host computer system, thereby causing said server program to be executed upon the occurrence of that interrupt instead of the operating system bootstrap loader of the host computer system.

17. The computer-readable medium recited in claim 15, wherein the server program, when executed on the host processor, performs the following steps to establish communications with the client program on the adapter card:

(a) allocates a portion of the host memory to serve as a communications buffer, and (b) stores a unique signature in the allocated communications buffer at a predetermined location therein.

18. The computer-readable medium recited in claim 17, wherein said allocation step comprises decrementing a value stored in host memory that provides an indicator of the top of available host memory.

19. The computer-readable medium recited in claim 17, wherein the client program, when executed on the adapter card, performs the following steps;

(a) locates the communications buffer using the indicator of the top of available host memory; and (b) determines whether the unique signature has been stored at said predetermined location therein to verify that the communications buffer has been created by the server program.

20. The computer-readable medium recited in claim 15, wherein the server program comprises a first part and a second part, the first part of the server program performing the following steps when executed on the host processor:

(a) allocates a portion of the host memory to serve as a communications buffer, (b) stores a unique signature in the allocated communications buffer at a predetermined location therein;

(c) saves the original interrupt vector for the host computer system clock interrupt to a predefined location in the host memory; and (d) hooks the start of the code of the second part of the server program to the host computer system clock interrupt, the second part of the server program performing the following steps upon each occurrence of the host computer system clock interrupt;

(e) call the original interrupt vector for the host computer system clock interrupt saved in step (c); and (f) check the communications buffer for any communication from the client program.

21. A computer readable medium as set forth in claim 15 wherein said new location is a top of host memory location.

* * * * *